United States Patent
Jing et al.

(10) Patent No.: US 9,853,589 B2
(45) Date of Patent: Dec. 26, 2017

(54) ELECTRIC POWER SYSTEM FOR CONTROLLING AN ELECTRIC MACHINE

(71) Applicant: GM GLOBAL TECHNOLOGY OPERATIONS LLC, Detroit, MI (US)

(72) Inventors: Xin Jing, Rochester, MI (US); Constantin C. Stancu, Auburn Hills, MI (US); Brian A. Welchko, Oakland, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 30 days.

(21) Appl. No.: 15/059,941

(22) Filed: Mar. 3, 2016

(65) Prior Publication Data

US 2017/0257049 A1    Sep. 7, 2017

(51) Int. Cl.

| | |
|---|---|
| *H02P 1/00* | (2006.01) |
| *H02P 27/08* | (2006.01) |
| *B60L 11/18* | (2006.01) |
| *H02P 6/14* | (2016.01) |
| *B60W 20/00* | (2016.01) |
| *B60W 10/08* | (2006.01) |

(52) U.S. Cl.
CPC .......... *H02P 27/08* (2013.01); *B60L 11/1803* (2013.01); *H02P 6/14* (2013.01); *B60L 2210/10* (2013.01); *B60W 10/08* (2013.01); *B60W 20/00* (2013.01); *Y02T 10/7005* (2013.01); *Y02T 10/7077* (2013.01)

(58) Field of Classification Search
CPC . Y02T 10/7005; Y02T 10/7077; Y02T 10/70; B60W 10/08; B60W 20/00
USPC .......................................................... 318/139
See application file for complete search history.

(56) References Cited

U.S. PATENT DOCUMENTS

| | | | |
|---|---|---|---|
| 5,668,464 A | 9/1997 | Krein | |
| 6,362,585 B1 * | 3/2002 | Hiti | ..................... B60L 11/1803 318/430 |

(Continued)

OTHER PUBLICATIONS

Thomas G. Habetler; "A Space Vector-Based Rectifier Regulator for AC/DC/AC Converters"; "IEEE Transactions on Power Electronics"; vol. 8; No. 1; pp. 30-36; Jan. 1993.

(Continued)

*Primary Examiner* — Shawki S Ismail
*Assistant Examiner* — Bradley Brown
(74) *Attorney, Agent, or Firm* — Quinn IP Law

(57) ABSTRACT

An electric power system including a front-end converter that is supplied electric power from a high-voltage DC power source, and an associated motor control system is described. A control method includes monitoring the electric machine and determining a reference current based upon the electric power supplied from the high-voltage DC power source. A motor current is determined based upon the monitoring of the electric machine, and a feed-forward current is determined based upon the motor current and the monitoring of the electric machine. A first duty cycle is determined based upon the reference current, the motor current and the feed-forward current, and a feed-forward duty cycle is determined based upon the monitoring of the electric machine. A second duty cycle is determined based upon the feed-forward duty cycle and the first duty cycle, and the front-end converter is controlled based upon the second duty cycle.

18 Claims, 2 Drawing Sheets

(56) References Cited

U.S. PATENT DOCUMENTS

| 7,675,192 | B2 | | 3/2010 | Tang | |
|---|---|---|---|---|---|
| 2015/0002058 | A1 | * | 1/2015 | Kashihara | ............ H02P 27/085 |
| | | | | | 318/400.3 |

OTHER PUBLICATIONS

S. K. Sul and T. A. Lipo; "Design and performance of a high frequency link induction motor drive operating at unity power factor"; IEEE Transactions on Industry Applications; vol. 26; No. 3; pp. 434-440; 1990.

Bon-Gwan Gu and Kwanghee Nam; "A DC-Link Capacitor Minimization Method Through Direct Capacitor Current Control"; "IEEE Transactions on Industry Applications"; vol. 42; No. 2; pp. 573-581; Mar./Apr. 2006.

Jung, Lim, and Nam; "A Feedback Linearizing Control Scheme for a PWM Converter-Inverter Having a Very Small DC-Link Capacitor"; "IEEE Transactions on Industry Applications"; vol. 35; No. 5; pp. 1124-1131; Sep./Oct. 1999.

Georgakas, Vovos and Vovos; "Harmonic Reduction Method for a Single-Phase DC-AC Converter Without an Output Filter"; "IEEE Transactions on Power Electronics", vol. 29; No. 9; pp. 4624-4632; Sep. 2014.

* cited by examiner

ELECTRIC POWER SYSTEM FOR CONTROLLING AN ELECTRIC MACHINE

TECHNICAL FIELD

The disclosure relates to electric power systems that employ inverters and electric machines, and development and control thereof.

BACKGROUND

A high-voltage electric power circuit for controlling an electric machine may include a high-voltage DC power source that is electrically connected to a front-end DC-to-DC electric power converter (hereafter 'front-end converter') to increase voltage that is supplied to a high-voltage DC bus of an inverter. A bulk capacitor may be arranged across the high-voltage DC bus to provide electrical stability and store supplemental electric energy. Operation and control of multi-phase electric motor/generators, such as permanent magnet synchronous electric motors may be accomplished by employing the inverter to transform DC electric power to AC power using pulsewidth-modulated (PWM) control signals that are output from a controller. Known inverters may be controlled in different operation modes, including PWM modes such as sine, hysteresis, over-modulation or space vector PWM modes, a six-step mode, or another suitable mode.

One cause of high ripple current on a DC bus is the operation of an inverter. High magnitudes of ripple current may be most noticeable when the inverter is operating in a six-step mode of inverter operation or other modes of operation wherein the output of the inverter occurs in discrete steps, which cause a large, low-frequency current ripple component to be drawn from the DC bus. This mode of inverter operation is necessary to maximize torque output from the electric machine. The magnitude of current ripple drawn from the DC bus may be reduced by employing low-frequency electronic input filters to the input of the inverter, wherein the size and power consumption of the electronic input filters are determined based upon the magnitude of the current ripple. However, this may result in a power electronics subsystem that may occupy a significant portion of space. It would therefore be desirable to have a control system and method that is capable of controlling DC bus voltage ripple to minimize the needed size, power consumption and heat generation of the electronic input filters, especially in systems that employ six-step or other step modes of inverter control to control an electric machine, including in systems wherein there are frequent changes in load or torque demands.

SUMMARY

An electric power system for supplying power to control an electric machine is described and includes an inverter that is electrically connected to a front-end converter that is supplied electric power from a high-voltage DC power source, and a motor control system. A method for controlling the front-end converter is described, and includes monitoring the electric machine and determining a reference current based upon the electric power supplied from the high-voltage DC power source. A motor current is determined based upon the monitoring of the electric machine, and a feed-forward current is determined based upon the motor current and the monitoring of the electric machine. A first duty cycle is determined based upon the reference current, the motor current and the feed-forward current, and a feed-forward duty cycle is determined based upon the monitoring of the electric machine. A second duty cycle is determined based upon the feed-forward duty cycle and the first duty cycle, and the front-end converter is controlled based upon the second duty cycle.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

Figure 1:
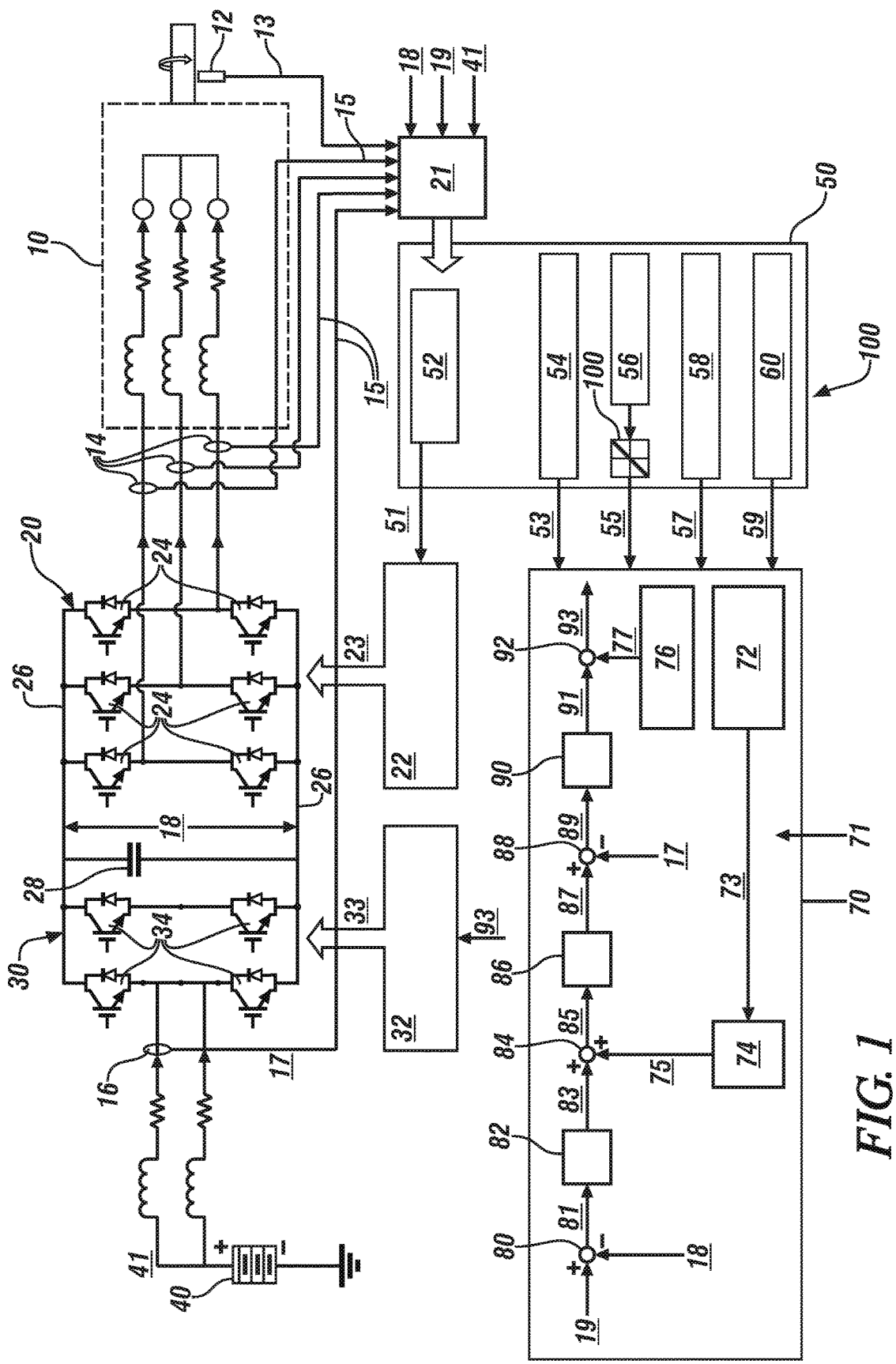
FIG. 1 schematically illustrates one embodiment of an electric power system for supplying power to control an electric machine, including an inverter that is electrically connected to a front-end converter that is supplied electric power from a high-voltage DC power source, and a motor control system, in accordance with the disclosure.

Referring now to the drawings, wherein the depictions are for the purpose of illustrating certain exemplary embodiments only and not for the purpose of limiting the same, FIG. 1 schematically illustrates one embodiment of an electric power system for supplying power to operate and control an electric machine 10. The electric power system preferably includes an electric inverter 20 electrically connected to a front-end converter 30 that is supplied electric power from a high-voltage DC power source 40. The front-end converter 30 is electrically connected to the electric inverter 20 via a high-voltage DC bus 26 that includes a bulk capacitor 28, and operates as a DC-to-DC electric power converter to increase the DC voltage level of the electric power that is supplied to the high-voltage DC bus 26. A motor control system 100 is disposed to monitor and control the electric inverter 20, the front-end converter 30 and the high-voltage DC power source 40. The motor control system 100 controls the electric inverter 20 and the front-end converter 30 to operate the electric machine 10 employing electric power that is supplied from the high-voltage DC power source 40 via the front-end converter 30 and the high-voltage DC bus 26. In one non-limiting embodiment, the electric power system may be employed on a vehicle as an element of a propulsion system. Design and control features related to the motor control system 100 for the electric inverter 20, front-end converter 30, high-voltage DC power source 40, high-voltage DC bus 26 and bulk capacitor 28 may be developed and assigned as described herein.

The electric machine 10 may be a motor/generator or another suitable multi-phase electric machine, e.g., a permanent magnet device. The power inverter module 20 electrically connects to the high-voltage DC electric power source 40 via the high-voltage DC bus 26. The power inverter module 20 includes the bulk capacitor 28 that is electrically arranged between a positive conductor and a negative conductor of the high-voltage DC bus 26. A rotational position sensor 12 is arranged to monitor a rotational position of a rotating output member of the electric machine 10, from which a motor speed/position 13 may be determined. The rotational position sensor 12 may be a resolver, a Hall effect sensor, another suitable rotational position sensing device, or a virtual software replacement.

In one embodiment, the motor control system 100 includes a Voltage Source Inverter (VSI) or other motor controller 50 for controlling the inverter 20, and the electric machine 10 is a permanent magnet synchronous device including a stator and a rotor arranged in a star configuration, although the concepts described herein are not so limited. The motor controller 50 controls torque output from the electric machine 10 through the inverter 20, which electrically connects to the high-voltage DC electric power source 40 via the front-end converter 30. Control methods for switching among inverter states to regulate torque output of the electric machine 10 may include operating in either a PWM mode or a six-step mode. In the PWM mode, the inverter 20 switches rapidly among two of non-zero states and a zero state. The motor controller 50 specifies what fraction of the time is to be spent in each of the three states by specifying PWM duty cycles. The motor controller 50 updates the PWM duty cycles at regular intervals such that the frequency of updates is significantly higher than the frequency of the rotor rotation. In the six-step mode, the inverter 20 is controlled to cycle the switches 24 through six non-zero states once per electrical cycle of the electric machine 10 to produce an AC voltage and current in each winding of the stator. An electrical cycle is defined relative to motor poles and does not necessarily correspond to a complete revolution of the rotor. Details of controlling the inverter 20 to operate the electric machine 10 are known to those skilled in the art.

In addition to the linear mode, the motor controller 50 preferably includes a current regulator and a six-step voltage controller for controlling operation of inverter 20 to control operation of the electric machine 10 in over-modulation and the six-step mode. The amplitude of the AC voltage is dictated by the magnitude of DC voltage on the high-voltage DC bus 26 that electrically connects via the front-end converter 30 to the high-voltage electric power source 40. The torque is dictated by the DC voltage, the rotor speed, and the phase difference between these quasi-sinusoidal AC voltage signals and the rotor position, and is further controlled by operating the control system in six-step mode. The motor controller 50 issues commands to the inverter 20 via an inverter gate drive 22 indicating when to switch to the next state in the sequence.

The power inverter module 20 is preferably electrically arranged between the front-end converter 30 and the electric machine 10, and includes a plurality of switches 24 that are arranged as switch pairs that electrically connect in series between the positive and negative conductors of the high-voltage DC bus 26. As shown, the electric machine 10 is configured as a three-phase device, and the power inverter module 20 includes three switch pairs, each of which is connected to one of the phases of the electric machine 10. Each of the switches 24 of the switch pairs may be an Insulated Gate Bipolar Transistor (IGBT) having a diode arranged in parallel, or another suitable high-voltage switch, e.g., a Field-Effect Transistor (FET) or a Silicon-Carbide (SiC) FET. An inverter gate drive circuit 22 preferably includes a plurality of gate drives and a controller, wherein the inverter gate drive circuit 22 generates control signals 23 to control activation and deactivation of the switches 24 in response to control signals 51, e.g., pulsewidth-modulated control signals, which originate from the motor control system 100. The power inverter module 20 includes other electrical components including capacitors, resistors and other electrical circuit components to accomplish functions related to electrical noise suppression, load balancing and the like.

Current sensors 14 are arranged to monitor magnitudes of electrical currents Ia, Ib and Ic 15 that are transferred to the a, b and c phases of the electric machine 10. In an embodiment wherein the electric machine 10 is arranged in a wye configuration (not shown), only two of the electrical currents may be monitored. The current sensors 14 may employ any suitable current sensing technology, including, e.g., magnetic field generation monitoring or voltage differential monitoring.

The bulk capacitor 28 may be any suitable capacitive storage device, e.g., an electrolytic aluminum device, a ceramic device, or a film device. Size of the bulk capacitor 28 may be described in terms of its total capacitance, and may be selected based upon amplitude of ripple voltage on the high-voltage DC bus 26 and other factors. As understood by those skilled in the art, capacitance of a bulk capacitor is determined in relation to parameters including peak current, RMS current, which is a parameterized value for the ripple voltage, minimum and maximum bus voltage levels, operating temperatures and others. As such, size of the bulk capacitor 28, in terms of its capacitance, may be selected based upon expected DC bus voltage ripple when operating the inverter 20 employing a six-step mode of operation. The bulk capacitor 28 is shown as a single device for ease of illustration. It is appreciated that the bulk capacitor 28 may be composed of a plurality of capacitor devices that are electrically arranged in series, parallel, or any other suitable electrical configuration to provide electrical capacitance in the electric circuit between the positive and negative conductors of the high-voltage DC bus 26. A voltage sensing system is arranged to monitor a bus electrical potential Vdc 18, which is measured across the positive and negative conductors of the high-voltage DC bus 26.

In one embodiment, and as shown, the front-end converter 30 includes two pairs of switches 34 arranged as switch pairs that electrically connect to the high-voltage DC power source 40, and also electrically connect between the positive and negative conductors of the high-voltage DC bus 26. As shown, the front-end converter 30 includes two switch pairs that are arranged between the positive and negative conductors of the high-voltage DC bus 26. Each of the switches 34 of the switch pairs may be an Insulated Gate Bipolar Transistor (IGBT) having a diode arranged in parallel, or another suitable high-voltage switch, e.g., a Field-Effect Transistor (FET) or a Silicon-Carbide (SiC) FET. Each of the switch pairs corresponds to one of the phases of the electric machine 10. A boost gate drive circuit 32 preferably includes a plurality of gate drives and a controller, wherein the boost gate drive circuits 32 generate boost control signals 33 to control activation and deactivation of the switches 34 in response to boost control signals 93, e.g., pulsewidth-modulated control signals, which originate from the motor control system 100. The front-end converter 30 includes other electrical components including capacitors, resistors and other electrical circuit components to accomplish functions related to electrical noise suppression, load balancing and the like. The electrical arrangement of the power inverter module 20, the front-end converter 30 and the electric machine 10 is known to those skilled in the art.

The high-voltage DC power source 40 may be any suitable electric power source, e.g., a lithium-ion battery or an ultra-capacitor. A voltage sensing system is arranged to monitor battery electrical potential Vbatt 41 that is supplied from the high-voltage DC power source 40 to the front-end converter 30. Current sensor 16 is arranged to monitor magnitude of electrical current that is transferred from the high-voltage DC power source 40 to a node connecting of one of the switch pairs the front-end converter 30, e.g., boost current Iα 17.

The motor control system 100 controls the electric inverter 20 and the front-end converter 30 to operate the electric machine 10 employing electric power that is supplied from the high-voltage DC power source 40 via the front-end converter 30 and the high-voltage DC bus 26. The motor control system 100 may be arranged as a unitary controller or as a plurality of controllers each having specific operational requirements. As shown, the motor control system 100 includes the motor controller 50 that generates motor control signals 51 that are communicated to the inverter gate drive circuit 22, and a boost controller 70 that generates boost control signals 93 that are communicated to the boost gate drive circuit 32.

The motor controller 50 monitors signal inputs from the motor control system 100 (21), with such signal monitoring taking suitable form, such as analog/digital conversion. The monitored signal inputs include electrical currents Ia, Ib and Ic 15 from the current sensors 14 arranged to monitor inputs to the a, b and c phases of the electric machine 10, the boost current Iα 17 from the high-voltage DC power source 40 to the front-end converter 30, the battery electrical potential Vbatt 41 that is supplied from the high-voltage DC power source 40 to the front-end converter 30, the bus electrical potential Vdc 18 across the positive conductor and the negative conductor of the high-voltage DC bus 26, and the motor speed/position 13 of the rotating output member of the electric machine 10. The motor controller 50 also monitors a motor torque command, which may be generated in another controller based upon an operator request for power.

The motor controller 50 executes multiple control routines to determine various control and operating states associated with the electric machine 10.

One operation of the motor controller 50 includes a PWM control routine 52 that determines the motor control signals 51 that are communicated to the inverter gate drive circuit 22 to control the inverter 20. The motor control signals 51 may be in the form of duty cycles for pulsewidth-modulated (PWM) signals that are determined based upon the motor torque command, the motor speed/position 13, the electrical currents 15 and the bus electrical potential Vdc 18. The motor control signals 51 may instead be in the form of six-step duty cycles for PWM signals for operating in the six-step mode that are determined based upon the motor torque command, the motor speed/position 13, the electrical currents 15 and the bus electrical potential Vdc 18.

Those skilled in the art are able to develop and implement a suitable PWM control routine 52 that determines the motor control signals 51. The motor control signals 51 preferably include Da, Db and Dc duty cycle control signals, wherein Da represents a duty cycle associated with controlling a first of the switch pairs of the inverter 20 that electrically connects to a first leg of the electric machine 10, Db represents a duty cycle associated with controlling a second of the switch pairs of the inverter 20 that electrically connects to a second leg of the electric machine 10, and Dc represents a duty cycle associated with controlling a third of the switch pairs of the inverter 20 that electrically connects to a third leg of the electric machine 10.

The motor controller 50 executes a DC current routine 60 to determine a DC motor current $I_{dc}$ 59 in accordance with the following equation:

$$I_{dc}=Da*Ia+Db*Ib+Dc*Ic \quad [1]$$

wherein:
  $I_{dc}$ represents the DC inverter current,
  Da, Db, and Dc represent the first, second and third duty cycle control signals, and
  Ia, Ib and Ic represent the electrical currents that are input to the a, b and c phases of the electric machine 10.

The motor controller 50 executes an average current routine 58 to determine an average current $I_{dc\_ave}$ 57, employing a mathematical transformation of a three-phase electrical system to a dq-reference frame that may be employed to simplify analysis and control, often referred to as a Park transformation. The dq-reference frame includes a direct (d-) axis and a quadrature (q-) axis, wherein the d-axis is associated with motor torque and the q-axis is associated with motor flux. The average current $I_{dc\_ave}$ 57 may be determined in accordance with the following equation:

$$I_{dc\_ave}=3*(Vd*Id+Vq*Iq)/(2*Vds) \quad [2]$$

wherein:
  $I_{dc\_ave}$ represents the average inverter current,
  Vd represents a direct axis voltage,
  Id represents a direct axis current,
  Vq represents a quadrature axis voltage,
  Iq represents a quadrature axis current, and
  Vdc represents the bus electrical potential Vdc 18 across the positive and negative conductors of the high-voltage DC bus 26.

The motor controller 50 executes a DC current ripple routine 54 to determine magnitude of the DC ripple current $I_{dc\_ripple}$ 53 in accordance with the following equation:

$$I_{dc\_ripple}=I_{dc}-I_{dc\_ave} \quad [3]$$

wherein:
  $I_{dc\_ave}$ is the average current that is calculated in Eq. 2, and
  $I_{dc}$ is the DC current that is calculated in Eq. 1.

Figure 2:
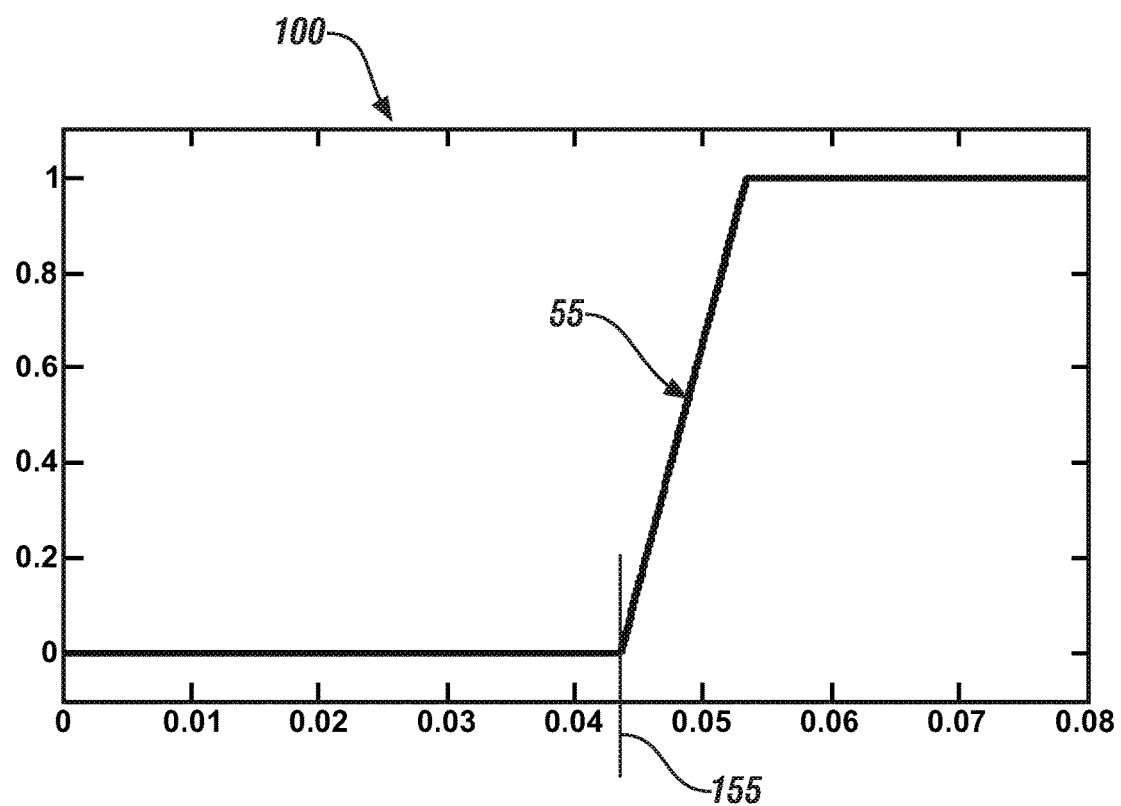
FIG. 2 graphically illustrates a magnitude of a control parameter for a motor control system disposed to control an embodiment of the electric power system described with reference to FIG. 1, wherein the control parameter is a six-step rate limiter $SS_{RL}$ shown in relation to time, including a timepoint indicating when a front-end converter is commanded to operate in a six-step mode, in accordance with the disclosure.

The motor controller 50 may execute a six-step transition routine 56 coincident with a command to operate the motor controller 50 in the six-step mode. The six-step transition routine 56 determines a time-based six-step rate limiter $SS_{RL}$ 55 that facilitates a transition between controlling the front-end converter 30 in the PWM mode and controlling the front-end converter 30 in the six-step mode. The motor controller may request a six-step operation, which is determined by the six-step active flag, which is indicated at timepoint 155 in FIG. 2. When the six-step active flag is set to be true, the controller will directly command six-step duty cycle, or else, it will provide PWM duty cycle. For the boost controller, six-step rate limiter is applied to the six-step active flag to provide a smooth transition for the feedforward term of the boost controller. The six-step transition routine 56 introduces the six-step rate limiter $SS_{RL}$ 55, which is a multiplier having a value between 0.0 and 1.0 that is determined in relation to elapsed time after commanding operation in the six-step mode. FIG. 2 graphically shows a control parameter 100, which indicates a magnitude for the six-step rate limiter $SS_{RL}$ 55 on the vertical axis, in relation to time on the horizontal axis, wherein the six-step mode is commanded at timepoint 155. The six-step transition routine 56 executes because the average DC current calculation routine 58 does not provide a correct waveform during the transition to six-step mode and during operation in the six-step mode. The six-step rate limiter $SS_{RL}$ 55 is employed by the boost controller 70. In a non six-step mode, only the motor current $I_{dc}$ may be used as the feedforward term to the front-end converter 30, which may provide a correct waveform to the front-end converter 30 during transient operation in the linear and over-modulation region. However, during operation in the six-step mode, using the motor current $I_{dc}$ as a feedforward term may not provide the best ripple cancellation results. Therefore, the motor current is separated into the average DC current and ripple DC current. The average DC current is used to compensate the voltage ripple that caused by sudden load/torque change from the electric machine, and the ripple DC current is used to compensate the ripple voltage that caused by six-step operation. The slew rate limiter is applied to the six-step active flag to provide a suitable transient response when transitioning into six-step operation.

The boost controller 70 includes a boost control routine 71, in the form of executable instructions and predetermined calibrations, that generates boost control signals 93 based upon the DC motor current $I_{dc}$ 59, the average current $I_{dc\_ave}$ 57 and the DC ripple current $I_{dc\_ripple}$ 53, taking into account the six-step rate limiter $SS_{RL}$ 55, the bus electrical potential Vdc 18, a commanded bus electrical potential Vdc* 19, the battery electrical potential Vbatt 41, and boost current Ia 17 to the front-end converter 30. The boost control routine 71 provides feedforward compensation terms that are separately added to a voltage controller element and to a duty cycle command generator to achieve better transient and steady state performance when the front-end converter 30 is operating either the PWM mode or the six-step mode.

The boost control routine 71 includes a first feed-forward compensation routine 74 to determine a feed-forward DC current $I_{dc\_ffd}$ 73 based upon the DC motor current $I_{dc}$ 59, the average current $I_{dc\_ave}$ 57, and the six-step rate limiter $SS_{RL}$ 55, as follows:

$$I_{dc\_ffd}=(1-SS_{RL})*I_{dc}+SS_{RL}*I_{dc\_ave} \quad [4]$$

The feed-forward DC current $I_{dc\_ffd}$ 73 is adjusted based upon a ratio of the bus electrical potential Vdc 18 divided by the battery electrical potential Vbatt 41 (74), to generate an adjusted feed-forward DC current $I_{dc\_ffd}$ 75. As is appreciated, when the front-end converter 30 is not operating in the six-step mode, or is not transitioning to operating in the six-state mode, the six-step rate limiter $SS_{RL}$ 55 has a value of 0.0, and thus the feed-forward DC current $I_{dc\_ffd}$ 73 is determined based upon the DC motor current $I_{dc}$ 59.

A difference 81 between the bus electrical potential Vdc 18 and the commanded electrical potential $V_{dc}^*$ 19 is determined via a difference operator 80 and is subjected to a proportional-integral control routine 82 to determine a reference current $I_{ref}$ 83.

The adjusted feed-forward DC current $I_{dc\_ffd}$ 75 is added to the reference current $I_{ref}$ 83 via an addition operator 84 to determine a resultant 85, which is multiplied by a factor of 0.5 via a multiplication operator 86 to determine a first commanded boost current $I_\alpha^*$ 87. The first commanded boost current $I_\alpha^*$ 87 is added to the boost current Ia 17 via an addition operator 88 to determine a total boost current $I_{\alpha\text{-}tot}$ 89. The total boost current $I_{\alpha\text{-}tot}$ 89 is input to a PI controller 90, which determines a commanded duty cycle D* 91 for controlling the boost gate drive circuits 32 based thereon.

A second feed-forward compensation routine 76 executes to provide a feed-forward compensation duty cycle $D_{ripple}$ 77 based upon the six-step rate limiter $SS_{RL}$ 55 and the DC ripple current $I_{dc\_ripple}$ 53, as follows:

$$D_{ripple}=(I_{dc\_ripple}*SS_{RL})/(2*I_\alpha) \quad [5]$$

The feed-forward compensation duty cycle $D_{ripple}$ 77 is combined (92) with the commanded duty cycle D* 91 to determine the boost control signals 93 for controlling the boost gate drive circuits 32.

As is appreciated, when the front-end converter 30 is not operating in the six-state mode, or is not transitioning to operating in the six-state mode, the six-step rate limiter $SS_{RL}$ 55 has a value of 0.0, and thus the feed-forward compensation duty cycle $D_{ripple}$ 77 has a value of 0.0, i.e., there is no feed-forward compensation.

In this manner, feedforward compensation terms derived from the motor controller 50 are separately added to the front-end voltage controller and duty cycle command generator to reduce the DC bus voltage ripple during PWM operation of the front-end converter 30 in the linear region and an over-modulation region associated with six-step operation, including DC bus voltage ripple cancellation through feedforward compensation.

Compensation terms are generated inside of the motor controller and are preferably corrected to account for computation and communication latencies, and may be communicated to the boost controller via a high speed digital communication link. As such, DC bus voltage ripple cancellation may be achieved by the boost control routine 71 executed in the boost controller 70 instead of employing a PWM rectifier circuit. A reduction in the DC bus voltage ripple may facilitate a significant reduction of the DC link capacitor size, in case of a given fixed DC link voltage ripple specification.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic instructions to control operation of actuators. Routines may be executed at regular intervals, for example each 100 microseconds during ongoing operation. Alternatively, routines may be executed in response to occurrence of a triggering event. Communication between controllers, and communication between controllers, actuators and/or sensors may be accomplished using a direct wired point-to-point link, a networked communication bus link, a wireless link or any other suitable communication link. Communication includes exchanging data signals in any suitable form, including, for example, electrical signals via a conductive medium, electromagnetic signals via air, optical signals via optical waveguides, and the like. The data signals may include discrete, analog or digitized analog signals representing inputs from sensors, actuator commands, and communication between controllers. The term "signal" refers to any physically discernible indicator that conveys information, and may be any suitable waveform (e.g., electrical, optical, magnetic, mechanical or electromagnetic), such as DC, AC, sinusoidal-wave, triangular-wave, square-wave, vibration, and the like, that is capable of traveling through a medium. The term 'model' refers to a processor-based or processor-executable code and associated calibration that simulates a physical existence of a device or a physical process. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A method for controlling a front-end converter, wherein the front-end converter is electrically connected to an electric inverter electrically connected to an electric machine via a high-voltage DC bus, and wherein a high-voltage DC power source is disposed to supply electric power to the front-end converter, the method comprising:
monitoring, via a controller, the electric machine;
determining a reference current based upon the electric power supplied from the high-voltage DC power source;
determining a motor current based upon the monitoring of the electric machine;
determining a feed-forward current based upon the motor current and the monitoring of the electric machine, including:
determining an average motor current,
determining a rate limiter term associated with a command to operate the front-end converter in one of a linear mode and a six-step mode, and
determining the feed-forward current based upon the motor current, the average motor current and the rate limiter;
determining a first duty cycle based upon the reference current, the motor current and the feed-forward current;
determining a feed-forward duty cycle based upon the monitoring of the electric machine;
determining a second duty cycle based upon the feed-forward duty cycle and the first duty cycle; and
controlling operation of the front-end converter based upon the second duty cycle.

2. The method of claim 1, wherein determining a reference current based upon the electric power supplied from the high-voltage DC power source comprises determining the reference current based upon a difference between a voltage potential of the high-voltage bus and a commanded voltage for the high-voltage bus.

3. The method of claim 1, wherein determining the feed-forward current based upon the motor current, the average motor current and the rate limiter comprises determining the feed-forward current based upon only the motor current when the rate limiter term is associated with a command to operate the front-end converter in the linear mode.

4. The method of claim 1, wherein determining the feed-forward current based upon the motor current, the average motor current and the rate limiter comprises determining the feed-forward current based upon the average motor current when the rate limiter term is associated with a command to operate the front-end converter in the six-step mode.

5. The method of claim 1, wherein determining a motor current based upon the monitoring of the electric machine comprises:
determining electric current supplied to the electric machine;
determining a motor torque command, motor speed, a battery electrical potential and a bus electrical potential;
determining commanded duty cycles for controlling the front-end converter based upon the motor torque command, the motor speed, the battery electrical potential and the bus electrical potential; and
determining the motor current based upon the electric current and the commanded duty cycles.

6. The method of claim 1, wherein determining a feed-forward duty cycle based upon the monitoring of the electric machine comprises:
determining a motor current;
determining an average motor current;
determining a ripple current based upon a difference between the motor current and the average motor current;
determining a rate limiter term associated with a command to operate the front-end converter in one of a linear mode and a six-step mode; and
determining the feed-forward duty cycle based upon the ripple current and the rate limiter term.

7. The method of claim 6, comprising determining the feed-forward duty cycle based upon the ripple current and the rate limiter term only when the command to operate the front-end converter comprises a six-step mode.

8. The method of claim 6, wherein the feed-forward duty cycle is zero when the command to operate the front-end converter comprises a linear mode.

9. The method of claim 1, wherein determining a second duty cycle based upon the feed-forward duty cycle and the first duty cycle comprises adding the feed-forward duty cycle and the first duty cycle.

10. An electric power system, comprising:
a front-end converter electrically connected to an electric inverter electrically connected to an electric machine via a high-voltage DC bus;
a capacitor electrically connected between positive and negative conductors of the high-voltage DC bus;
a high-voltage DC power source disposed to supply electric power to the front-end converter;
a controller in communication with the front-end converter, the electric inverter, the electric machine, and the high-voltage DC power source, and operatively connected to the front-end converter and the electric inverter, the controller including an instruction set, the instruction set executable to:
monitor operation of the electric machine;
determine a reference current based upon a magnitude of electric power supplied from the high-voltage DC power source;
determine a motor current based upon the operation of the electric machine;
determine a feed-forward current based upon the motor current and the operation of the electric machine;
determine a first duty cycle based upon the reference current, the motor current and the feed-forward current;
determine a feed-forward duty cycle based upon the monitoring of the electric machine, including the instruction set executable to:
determine an average motor current,
determine a rate limiter term associated with a command to operate the front-end converter in one of a linear mode and a six-step mode, and
determine the feed-forward current based upon the motor current, the average motor current and the rate limiter;
determine a second duty cycle based upon the feed-forward duty cycle and the first duty cycle; and
control operation of the front-end converter based upon the second duty cycle.

11. The electric power system of claim 10, wherein the instruction set is executable to determine the reference current based upon a difference between a voltage potential of the high-voltage bus and a commanded voltage for the high-voltage bus.

12. The electric power system of claim 10, wherein the instruction set is executable to determine the feed-forward current based upon only the motor current when the rate limiter term is associated with a command to operate the front-end converter in the linear mode.

13. The electric power system of claim 10, wherein the instruction set is executable to determine the feed-forward current based upon the average motor current when the rate limiter term is associated with a command to operate the front-end converter in the six-step mode.

14. The electric power system of claim 10, wherein the instruction set is executable to:
determine electric current supplied to the electric machine;
determine a motor torque command, motor speed, a battery electrical potential and a bus electrical potential;
determine commanded duty cycles for controlling the front-end converter based upon the motor torque command, the motor speed, the battery electrical potential and the bus electrical potential; and
determine the motor current based upon the electric current and the commanded duty cycles.

15. The electric power system of claim 10, wherein the instruction set is executable to:
determine a motor current;
determine an average motor current;
determine a ripple current based upon a difference between the motor current and the average motor current;
determine a rate limiter term associated with a command to operate the front-end converter in one of a linear mode and a six-step mode; and
determine the feed-forward duty cycle based upon the ripple current and the rate limiter term.

16. The electric power system of claim 10, wherein the instruction set is executable to determine the feed-forward duty cycle based upon the ripple current and the rate limiter term only when the command to operate the front-end converter comprises a six-step mode.

17. The electric power system of claim 10, wherein the instruction set is executable to determine wherein the feed-forward duty cycle is zero when the command to operate the front-end converter comprises a linear mode.

18. The electric power system of claim 10, wherein the instruction set is executable to determine a second duty cycle based upon the feed-forward duty cycle and the first duty cycle by numerically adding the feed-forward duty cycle and the first duty cycle.

* * * * *